United States Patent [19]

Duret

[11] Patent Number: 4,494,777

[45] Date of Patent: Jan. 22, 1985

[54] CLOSED ANGLE THREAD PIPE JOINT

[75] Inventor: Jean Duret, Montpellier, France

[73] Assignee: Vallourec, S.A., Paris, France

[21] Appl. No.: 613,751

[22] Filed: May 23, 1984

Related U.S. Application Data

[63] Continuation of Ser. No. 191,993, Sep. 29, 1980, , which is a continuation of Ser. No. 077,933, Sep. 24, 1979, , which is a continuation of Ser. No. 818,246, Jul. 22, 1977.

[30] Foreign Application Priority Data

Jul. 23, 1976 [FR] France ................................ 76 22543

[51] Int. Cl.³ .............................................. F16L 9/14
[52] U.S. Cl. ..................................... 285/55; 285/334; 285/369
[58] Field of Search ............... 285/333, 334, 390, 356, 285/55, 364; 403/346

[56] References Cited

U.S. PATENT DOCUMENTS

| | | | |
|---|---|---|---|
| 2,062,407 | 12/1936 | Eaton | 285/334 |
| 2,207,005 | 7/1940 | Haas | 285/334 X |
| 2,574,081 | 11/1951 | Abegg | 285/334 X |
| 3,041,088 | 6/1962 | Brandon | 285/355 X |
| 3,224,799 | 12/1965 | Blose et al. | 285/334 |
| 3,307,860 | 3/1967 | Blount et al. | 285/334 X |
| 3,359,013 | 12/1967 | Knox et al. | 285/334 X |
| 3,572,777 | 3/1971 | Blose | 285/334 |
| 3,574,373 | 4/1971 | Le Derf | 285/333 |

FOREIGN PATENT DOCUMENTS

| | | | |
|---|---|---|---|
| 1564218 | 4/1969 | France | 285/334 |
| 800348 | 8/1958 | United Kingdom | 285/333 |

Primary Examiner—Dave W. Arola
Attorney, Agent, or Firm—Arnold, White & Durkee

[57] ABSTRACT

A threaded pipe joint including male and female sections, each with corresponding closed angle threading. Cooperating abutments are on the respective male and female sections. The closed angle threading diminishes in height in the region adjacent the abutments, which limit axial movement of the sections with respect to each other and thereby prevent movement which would permit the closed angle threads to separate.

14 Claims, 12 Drawing Figures

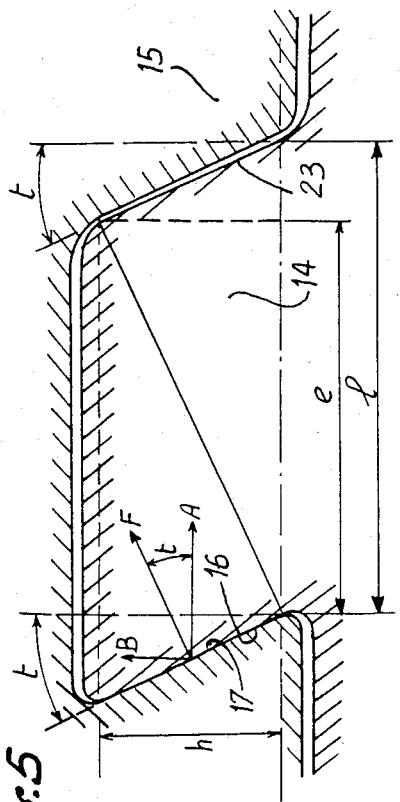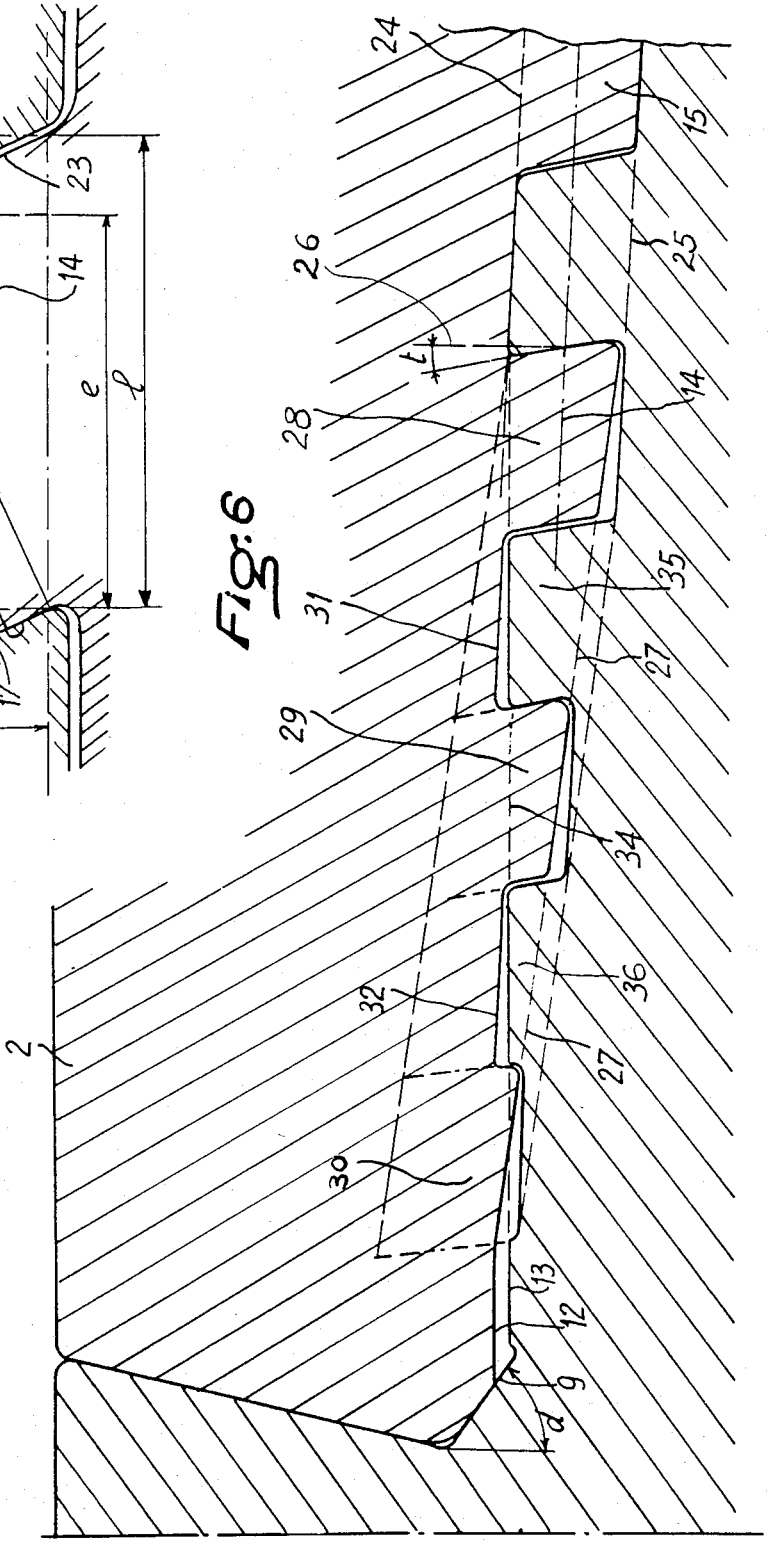

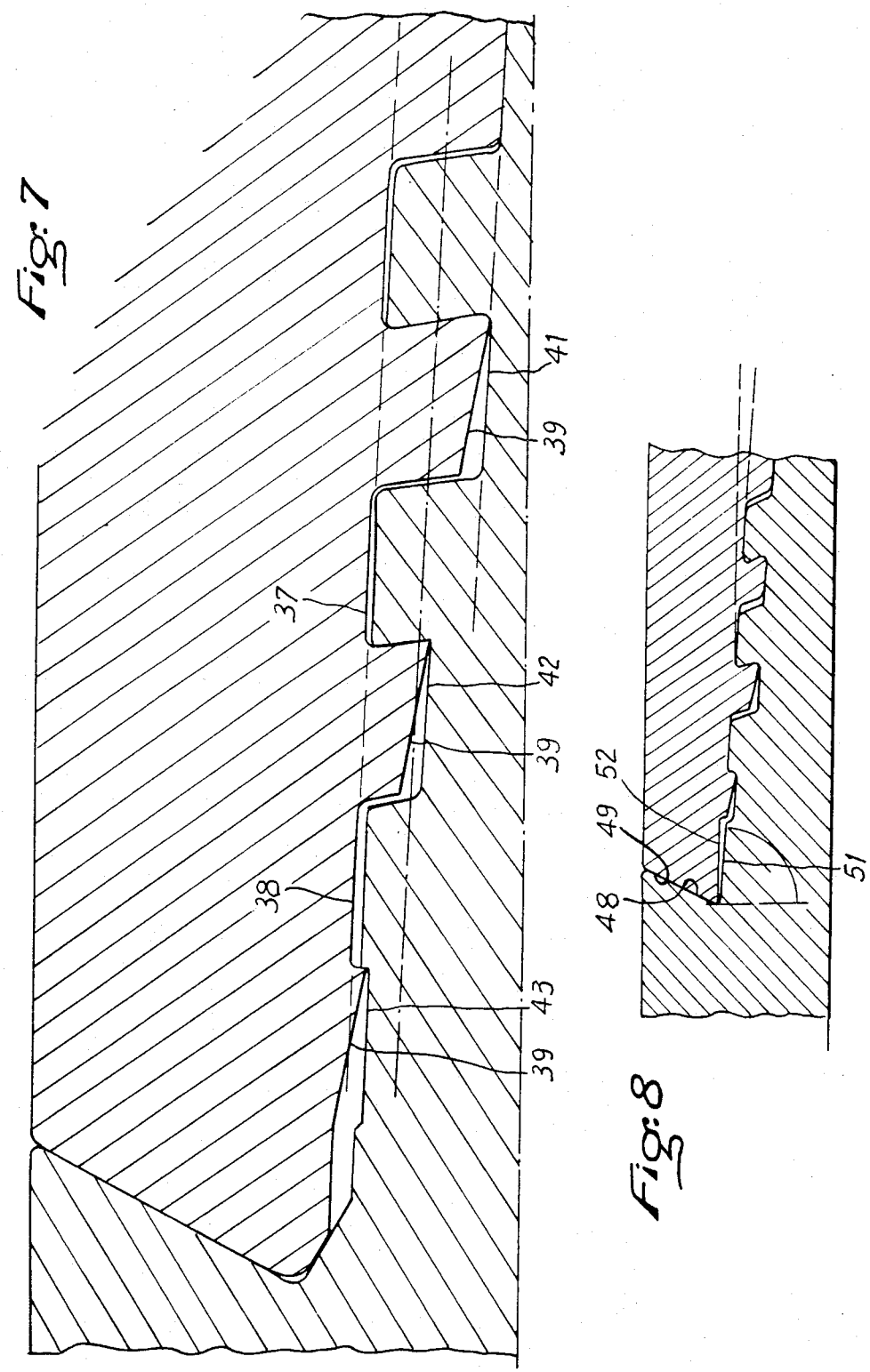

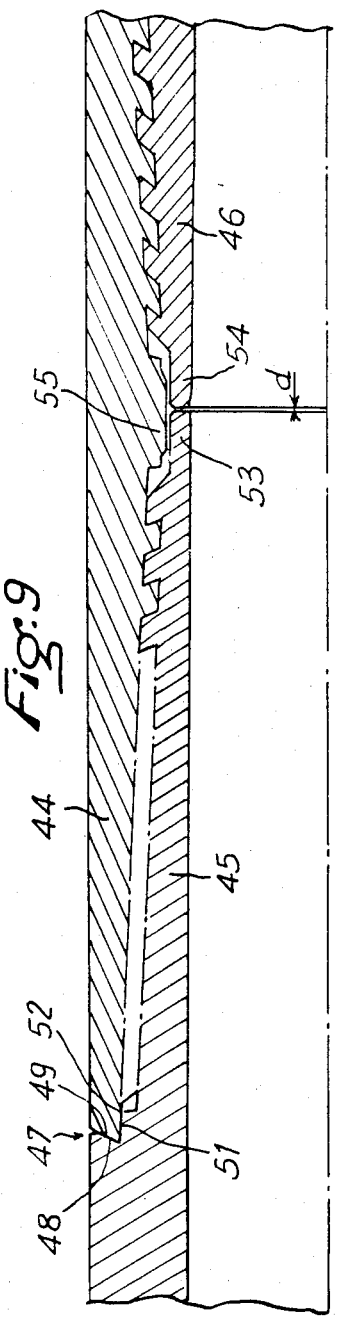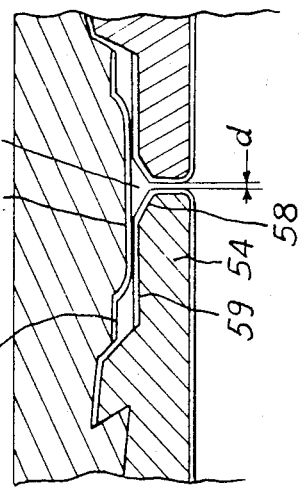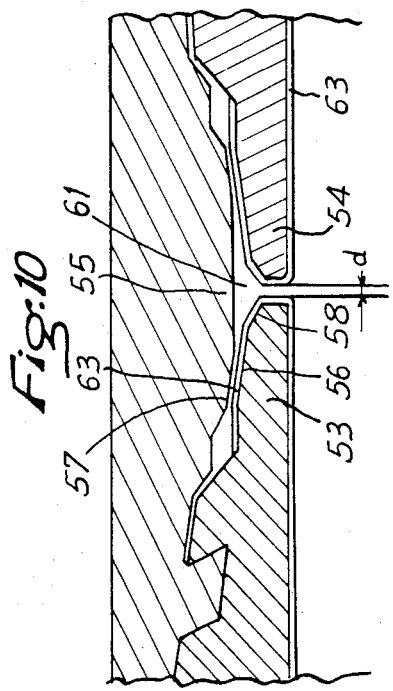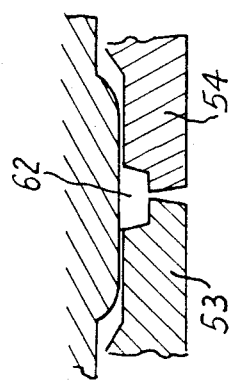

CLOSED ANGLE THREAD PIPE JOINT

This application is a continuation of application Ser. No. 191,933, filed Sept. 29, 1980, which is a continuation of application Ser. No. 77,933, filed Sept. 24, 1979, which was a streamline continuation of Ser. No. 818,246, filed July 22, 1977.

SUMMARY OF THE INVENTION

The present invention relates to a new pipe joint, to join pipes of the type comprising a male part and a female part with corresponding threadings, the male or female parts being located either directly at the end of the pipes, or in coupling sleeves or nipples.

The joints according to the invention have particular utility to unite the ends of pipes to each other, where the pipes are in very long columns or strings, and form for example, pipelines for fluid, or strengthening casings or liners in holes drilled for the production of petroleum, gas or fresh natural water, or to make fluids circulate in the earth, or for all other applications.

It is known that in a pipe string, for example in the field of drilling or in the operation of petroleum wells, the most critical problems are posed by the joints which join the ends of the pipes or tubes. For evident reasons, it is most desirable to obtain the same mechanical characteristics at the joints as that obtained in the walls of the pipes themselves.

To attain such objectives numerous joints have been proposed which require a notable increase in thickness at the joint in relation to that of the bodies of the pipes themselves, this increase in thickness causing either an increase in outer diameter, or a decrease in inner diameter, or both. These increases in thickness require special complicated operations during the fabrication of the pipes and in addition the dimensional variations thus created are troublesome in many applications.

If, on the other hand, it is desired that the thickness of the joint not be different from the thickness of the body of the pipes, the diameters being exactly identical, it is understood that whatever the type of male or female threading used, cylindrical with several stages, or tapered or conical, the thicknesses of each male and female part is notably less than the thickness of the body of the pipe, and even the sum of the thicknesses of the male and female parts is not equal to the thickness of the body of the pipe because of a reduction in thickness by removal of material and by the presence of the grooves and clearances of the screws threads. It follows from this that the resistance of each of the two male and female elements to longitudinal forces, namely pulling forces, would be less than that of the body of the pipe itself. One can, in numerous applications, accept such a reduction of resistance but the decreased thickness of the male and female ends of the joint introduce other much less acceptable disadvantages.

In effect each of the male and female parts presents likewise, because of its lesser thickness, less resistance to the effects of pressure from internal and external fluids, or rather from the difference of pressures between the exterior and the interior and known as differential pressure. According to the conditions of use, this differential pressure manifests itself either from the interior towards the exterior, or in the opposite direction.

If it is not desired to increase the wall thicknesses at the male and female elements of the joint, it becomes necessary, to obtain absolute fluid-tightness at the two extremities of the threading joining the male element and the female element of the joint to positively prohibit the introduction of fluid pressure into the interstices of the assembly. However, while it is relatively easy to assure an effective fluid-tightness against exterior or interior excess pressure, obtaining effective fluid-tightness in both directions is much more difficult and leads to costly joints of more complicated form, as for example those described in French patent No. 2,047,274.

But there exist numerous conditions of use in which, in a pipe string, the direction of the differential pressure changes either with time, or as a function of the depth of the point considered.

The present invention proposes to solve these problems and to furnish a joint for the connection of cylindrical pipes, especially for the formation of very long strings in the drilling field or in petroleum operations, which can remedy the above-mentioned disadvantages and which do not necessitate increase of the thickness of the male and/or female element of the joint, the internal and external contours of the joint thus forming straight cylindrical extentions of the body and the bore of the pipe without a change of the outline of the pipe.

A variation of the invention likewise proposes to provide joints in which only a moderate increase in thickness is provided to increase the outer diameter or moderately narrow the inner diameter of the joint in relation to the diameter of the body of the pipe and this without changing the geometry of the adjacent surfaces.

Another object of the invention is to furnish joints which resist mechanically perfectly, differential pressures that are directed from the inside towards the outside or from the outside toward the inside.

Another object of the invention is to furnish a joint having perfect fluid-tightness between the interior and the exterior and vice-versa.

Another object of the invention is to furnish a joint having an abutment for limiting screwing in which an excessive screwing thrust caused by a wrong maneuver does not cause notable distortion of the extremities of the elements of the joint, and such distortions and the partial or total dislocation of the threads adjacent the abutment are prevented or retarded considerably.

The invention has as an object a joint designed for screwing together ends of pipes, and comprising a male part having a male threading, a female part with a female threading to receive the male threading by screwing, the threads of these threadings presenting at least along the greatest length of these threadings, respectively complementary closed angle threads, and including abutment means to limit the extent of threading of the male element into the female element, characterized by the fact that the said threadings at closed angles flatten and diminish progressively up to the immediate vicinity of the abutment shoulder of one of the elements cooperating with the complementary abutment shoulder located at the extremity of the other element to thus maintain, by the interengagement of said threads at closed angles, a radial hooking connection up to the immediate vicinity of said abutment shoulder.

By threads at closed angles in the sense of the present invention, is meant male and female threads whose supporting flanks cooperate, that is to say the flanks which compress against each other when the male element and the female element of the joint undergo a force of axial pull tending to pull them away from each other, form with the geometric axis of the joint (and their adjacent thread grooves) an angle less than 90°, in such a way that all radial separation of one male thread with a corresponding female thread is impossible unless there is simultaneously an axial displacement tending to separate the two flanks of the threads from each other to disengage them.

Thus it should be understood that an essential characteristic of the invention resides in the combination between such threadings with threads at closed angles extending to the immediate vicinity of the abutment, with one axial abutment formed by two shoulders cooperating with each other in such a way that when under the effect, for example, of a differential pressure tending to cause the male and female elements to pull away radially from each other, this withdrawal or movement is prevented by the threads interlocking, with an angle of the supporting flank less than 90°, and the threads cannot withdraw themselves radially from each other, since all axial movement which would permit a sufficient separation of threads to permit them to move radially from each other is prevented by the abutting of the male and female elements against each other by their shoulders, and all barrel distortion of the extremity of the female part is therefore prevented.

In a particularly preferred embodiment of the invention the threads at closed angles of the male and female threading present a cross-section in the shape of a parallelogram or at least a trapezoidal form close to a parallelogram.

In a particularly advantageous manner the width of a thread, that is the distance between two flanks of the thread at the base of the thread is in a range between 1.5 and 2.5 times the useful height of the thread, and in a particularly preferred embodiment between 1.8 and 2.2 times the useful height of the thread. These values are for newly manufactured threads. They can naturally be more or less diminished following successive uses of the joints.

These characteristics assure a sufficient strength of the threads and maintain the interlocking or hooking of the threads of the male and female threadings under the most unfavorable conditions, that is under conditions where the differential pressure is the greatest, while permitting the geometric differences (resulting from manufacturing tolerances) of the closed angles used for the threads and the differences in pitch on the entire length of the threading to be absorbed at the time of assembling the joint and of its use, by elastoplastic deformation of the subjacent metal at these thread flanks, without these threads being weakened in a troublesome fashion.

In general, in addition, in the most severe conditions of use, the greater the magnitude of the differential pressure, the more it is preferable to decrease the closed angle of the said thread flank, relative to the joint axis, or stated differently, to increase the closed angle as measured between a thread flank and a transverse plane perpendicular to the axis of the joint.

This angle can be calculated, and it is found that it can be quite large. It can be, for example, on the order of 38° in relation to the plane perpendicular to the axis.

However experience shows that the joints according to the invention present a satisfactory holding for much smaller angles of 10° to 20°.

In a particularly preferred embodiment of the invention, the abutment means has a male shoulder and a female shoulder which constitute simultaneously a limiting abutment of driving in and of screwing, and a fluid tight surface. Preferably the abutment is made in the form of two bi-conical surfaces. In such an embodiment one of the two shoulders has an annular internal concave surface preferably truncated or of similar form, this surface being enclosed by an annular peripheral convex surface preferably in the form of a truncated cone or of a similar form but likewise being able, as a variation, to be almost cylindrical. Likewise the other shoulder has a truncated, or an essentially truncated internal convex surface, and a concave external surface preferably truncated but being able also to have an essentially cylindrical shape. The surface corresponding to the male and female elements can have strictly complementary forms or simply forms adapted to come in contact with each other to obtain the effects of abutment and watertightness.

The abutment is preferably external, that is that the female element has a shoulder located at its extremity while the male element has a complementary shoulder adjacent the base of its thread.

The choice between the two solutions depends on different considerations concerning the functioning, it being understood that in the case of an external abutment, when the female element is axially compressed against the male element, the extremity of the female element tends to distort itself in barrel shape radially outwardly in such a way that the female threads have a tendency to extend themselves radially away from the male threads, this tendency to pull away being however prevented in the case of the present invention. In the case where the abutment is internal and in which such a compression takes place, the male element likewise has a tendency to distend inwardly in the form of a barrel but in this case to the contrary this distension tends to make the male and female threads interlock each other still more tightly.

In the two cases however in the event of improper assembly the invention contributes an increase in strength in preventing or retarding these distortions and consequently in preventing the distortion of the abutment, which prevents or at least retards considerably the partial or total dislocation of the threads in the neighborhood of the abutment.

In an advantageous manner the angles of the internal and external surfaces of the male and female shoulders can be so proportioned that one of the truncated surfaces or surfaces of a similar form plays a principal role of watertightness and the other a principal role of abutment, but in a general fashion the internal and extenral surfaces can exchange roles, thus assuring watertightness both against an external differential pressure and against an internal differential pressure.

In addition, the abutment shoulder can preferably be such that both in the male shoulder and in the female shoulder, the more or less truncated surface having the greatest radial extent possesses a step or width, that is to say in practice a base extension greater or equal to 1.8 times the useful radial extent. As a consequence in the case where the joint possesses a female sleeve equipped with two internal shoulders placed near each other towards the middle of the sleeve, the distance between the two shoulders should be at least 3.6 to 5 times the useful radial extent.

Likewise the angle made by this surface with the transverse plane perpendicular to the axis of the joint, can be for example from 15° to 20°.

The angle of the other surface in relation to the transverse plane can be much greater and can go up to 90°, the surface becoming then practically cylindrical.

The abutment arrangement thus realized possess a very high radial strength which is first of all designed to support the differential pressure of the fluid and to assure perfect fluid tightness. It serves equally to efficiently oppose the distortion of barrel shape in the event of a too great longitudinal push resulting from, for example, an excessive screwing. It also serves to increase the contact pressure at the conical surface of the female shoulder which has the smallest radial dimension and is not exposed at the walls, in order to flatten unevenness from manufacturing and to flatten irregularities from shocks so that it is able to be produced on the pipes during joining operations, especially during drilling.

In a perfected embodiment of the invention the threading at a closed angle diminishes progressively but rapidly when it approaches the abutment shoulder of the element which bears it. Preferably the diminished threading extends proportionately over one to seven threads.

This permits the thickness of the metal near the abutment to be increased, as is already known in other types of joints. This presents likewise the supplementary advantage of being able to bring closer together, at the abutment, the ends of the useful part of the male and female threads. In effect, because of the thread angle, the engaging of the supporting flanks remains effective for a long time, even when these flanks possess only a very small height, while in addition if the threads were made in an undiminishing fashion it would be necessary with certain machines, because of the path of disengagement of the threading tool at the end of the thread, near the abutment, to make a useless diminishing hollow or cut of a greater length. In addition, an oblique disengagement of the tool is not possible on all machines, and would require a significant leading axial distance to extend the end of the thread to the abutment shoulder. On the other hand, and especially in the case which conforms to a preferred variation of the invention, the threads have a cross-section of a parallelogram or of a trapezoid very close to a parallelogram, the threadings can be made on a standard thread cutting machine by simple progressive radial turning of the tool without causing a modification of the axial thickness of the threads and grooves, which permits forming a diminishing male threading part cooperating effectively with a diminishing female threading part. From the fact of radial displacement of the tool during the threading one understands that it is possible to produce a slight axial displacement of the flanks of the male and female threads corresponding to a kind of variation of the thread pitch. In conveniently choosing the two male and female elements which present on a level with the diminishing part an apparent longer thread pitch, it becomes apparent that at the time of screwing, the first contact without force between the active threads takes place in a remote position of the abutment, and thus the force which will absorb the above mentioned pitch variation will be the weakest and will only lead to slight constraints in the metal.

As a variation, the disappearing part of the thread, which diminishes progressively in height can terminate at one end of a thread root at a place where the thread still possesses a sufficient height to be effective, for example between 15 and 40% of the height of the normal thread.

In an advantageous fashion one can in certain cases make the joint according to the invention in a way to protect the threadings from the entry of internal fluid and to achieve a continuity of the internal wall of one pipe with the other by eliminating the causes of turbulence and loss of pressure, and by assuring a watertightness against the internal fluid even in the case where the abutment is placed on the external side of the joint.

In this embodiment one uses pipes whose extremities form the male parts of joints according to the invention and which cooperate with female sleeves forming two female parts of joints placed on both sides of a transverse median plane, the abutments being disposed on the external side, that is to say on the two extremities of the female sleeve. The extremities of the male pipes each present then an end in the form of a long cone or preferably in the form of a cylinder with a bevel, the ends cooperating with truncated cone surfaces or a cylindrical surface corresponding to the central part of the sleeve to provide watertightness, the two ends of the two successive pipes being able then to come in contact with each other to realize the continuity. Preferably a slight space can be provided peripherally at the contact zone to permit a deformation of the metal of the abutting ends.

As a variation the two ends can be spaced a certain distance and a watertight element can then be received between the extremities of the two male elements.

The watertightness can likewise be realized, as a variation, by assuring a continuous coating of the internal surface of the male elements as well as the external surface of the ends of the male elements and of the internal surface of the female sleeve in its central part located between the two zones where the watertight contact with the adjacent ends of the two male elements is effected. Preferably the ends of the male elements are made with a small thickness in a manner to facilitate their deformation.

Other advantages and characteristics of the invention will be apparent from the following description, given purely as an example, not intended to be limiting, and refering to the attached drawings.

BRIEF DESCRIPTION OF DRAWINGS

FIG. 5 is an enlarged view in axial section of a thread;

FIG. 6 is a detailed partial view in axial section of a joint like that of FIG. 1 with a diminishing threading;

FIG. 7 shows a variation of the embodiment of the joint of FIG. 6;

FIG. 8 shows, in axial section, another variation of the joint of FIG. 1; and

FIGS. 9 to 12 are views in axial section showing other embodiments which provide internal continuity.

Figure 1:
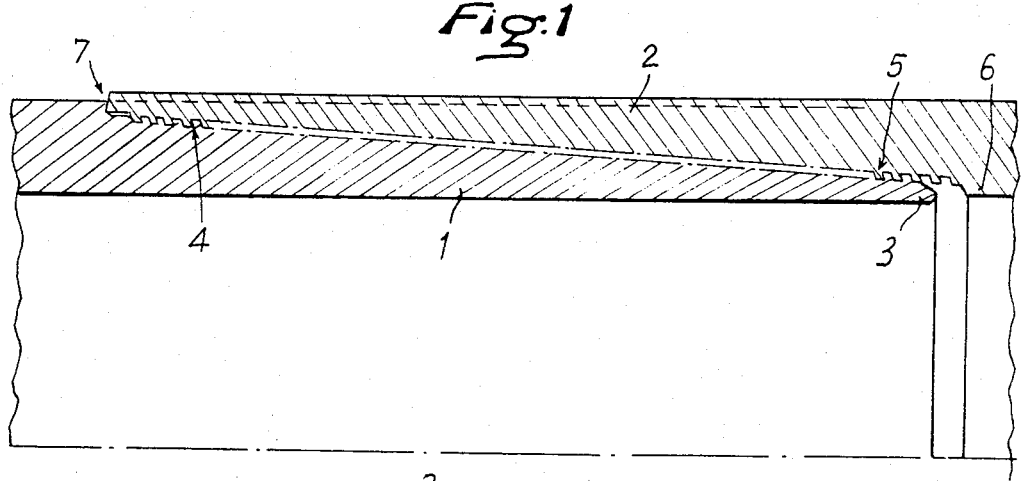
FIG. 1 is a view in axial section of a joint according to the invention with an external abutment.
Figure 2:
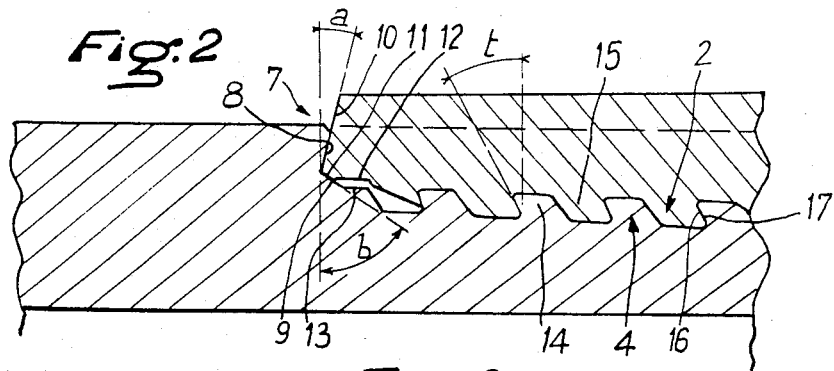
FIG. 2 is an enlarged partial view of the joint of FIG. 1 showing the abutment region.

Refering first to FIGS. 1 and 2, the joints shown is constituted by the two extremities of two pipes, one screwed into the other, a male extremity 1 serving as the male element of the joint, and a female extremity 2 serving as the female element of the joint. Element 1 comprises, from adjacent its extremity 3 a threading 4 made in the tapered or conical external surface of element 1. Likewise female element 2 presents a complementary threading 5 made in the internal tapered or conical surface of element 2 and extending to its base 6. The two complementary threadings 4,5 extend to the region of an abutment 7 whose form will be better seen in FIG. 2. This abutment, situated towards the exterior of the joint comprises two shoulders, that is a shoulder on the male element 1 and a shoulder on the female element 2. The shoulder of male element 1 comprises, from the exterior, a first truncated concave surface 8 which makes an angle a, with a plane perpendicular to the axis of the joint. Inside this truncated concave surface 8 is a truncated convex surface 9 which makes with the same plane an angle b which is greater than a. Likewise the shoulder of female element 2 presents a truncated external convex surface 10 inclined according to angle a and engaging surface 8, and an internal truncated concave surface 11 inclined according to angle b and engaging surface 9. Surface 11 extends towards the interior along a slightly conical or cylindrical surface 12 facing a similar surface 13 of the male element, the two surfaces 12 and 13 being spaced from each other by a certain distance. It is apparent that when one screws the two elements together, a point is reached where the two shoulders abut, and contact is made between the different surfaces of the shoulders. It is evident, in addition, that in the case of an external differential pressure, that is a greater external pressure, surfaces 11 and 9 are strongly pressed against each other and the joint is pressure sealed. In the case of an internal excess pressure it is surfaces 8 and 10 which are forced against each other and become pressure sealed.

The threads 14 of threading 4, and threads 15 of threading 5 have essentially the form of a parallelogram and one can see that their supporting or side flanks, that is to say flanks 16, 17, form a closed or acute angle designated by the angle t.

In these conditions in the case where for any reason the extremity of the female element tends to want to separate itself radially from the male element 1 by increasing the diameter of female element 2, for any causes whatever, for example, too great longitudinal force coming from for example excess screwing, or the existence of an interstitial pressure between the threads, or any other reason, the closed angle threads 14, 15 hook or interlock rendering the male and female elements essentially integral with each other in such a way that a radial expansion of the female element 2 is resisted by the strength of the male element 1 because the contact between the abutment shoulders prevents any axial displacement in a direction which would permit the disengagement of the male and female threads.

The invention, by this new combination thus distinguishes itself notably from the joints of prior art which were able, in certain cases, to produce on extremities of increased thickness, threads with slightly closed angles with the single aim of increasing the friction between the flanks of the threads to thus retard the disengaging of the threads in the event of too great stresses of axial pull.

Figure 3:
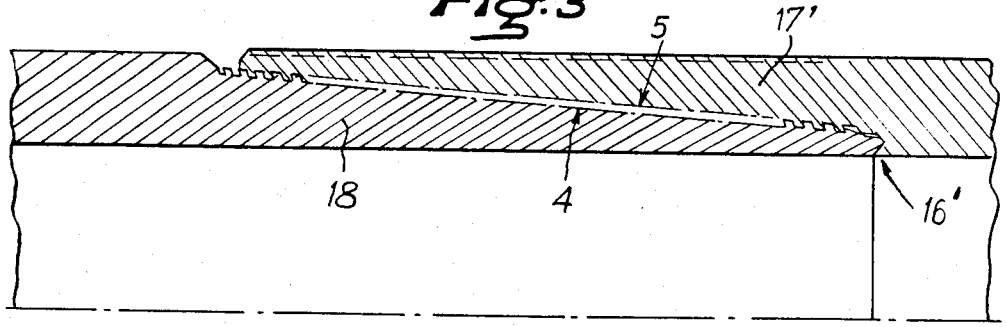
FIG. 3 is a view in axial section of an embodiment with an internal abutment.
Figure 4:
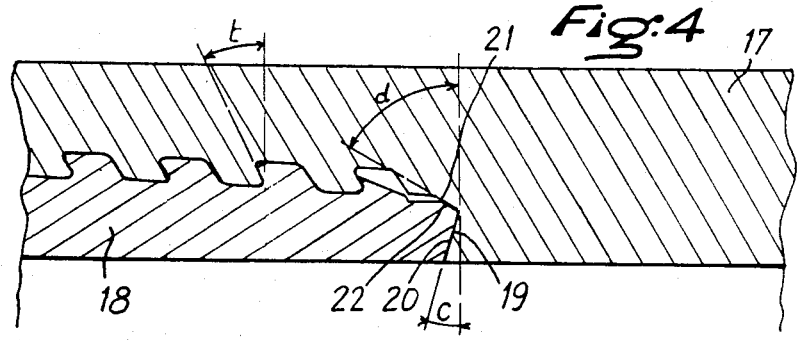
FIG. 4 is a detailed enlarged partial view of the abutment region of the joint of FIG. 3.

Referring to FIGS. 3 and 4 there is shown a joint of the invention according to another embodiment in which the tapered threadings with threads 4, 5, at closed angles, are used but where the abutment 16' is in this embodiment internal, and is located at the extremity of the male element. One can see that here, it is the female element 17 which has an internal tapered convex surface 19 cooperating with a concave tapered surface 20 of the end extremity of the male element and inclined at an angle c to a diameter while the more peripheral surface 21 of the female element has a concave tapered form and cooperates with a peripheral convex tapered surface 22 of the male element 18 forming an angle d.

In this embodiment likewise, the two male and female elements are made essentially integral by the cooperation of the threads at closed angles with the abutment 16'. If in this embodiment, under the effect of sufficient force, the extremity of the male element 18 has a tendency to bulge inwardly, in the shape of a barrel, it tends to draw closer to the female element and the functioning of the assembly is better yet.

Referring particularly to FIG. 5, there is shown the form of the male threads 14 and the female threads 15 of the male element and of the female element.

According to the invention the threads are made with closed angles whose value is established not to obtain a resistance to sliding of the flanks of the threads on each other but to obtain conditions of strength as high as possible as far as the metal in back of the supporting flanks of the threads is concerned, the threads being conceived to hold up, in the most unfavorable case, which combines the strongest axial push on the flank of the thread with the greatest radial force.

The width l of a thread is selected to obtain the desired resistance to the forces of axial pull tending to pull the two elements away from each other.

In fact to resist the greatest axial strain, A provides for the thread step coming from the factory to be of a value e provided to resist these strains in spite of wear and tear and deformations resulting from assembly. However in considering likewise the greatest radial stress B possible, the resultant force F will be directed obliquely. Conforming to the invention the supporting flank 16 will be made with an angle t such that the flank will be perpendicular to the resultant force F if the force is not too inclined. It will then be necessary to increase the width of the thread above the value of the thread step e to give it the value l taking into consideration this inclination of the flank. Thus the diagonal of the parallelogram extends parallel to the resultant F and the thread will offer a maximal resistance to this force. One can see however that for manufacturing reasons one is not able to vastly increase the value of angle t and in practice an angle t on the order of 10° to 25° is practical although it can be greater if desired. It is possible then in practice to have an angle t less than the ideal value perpendicular to the force F so that a certain tendency for flanks 16, 17 to slide on each other exists but such sliding, according to the invention is prevented by the abutment.

It can be seen in the drawing that all distances for example l, e or the useful height h have been chosen to account for the really useful material, that is by not considering the rounded or chamfered portions inevitably necessary particularly for manufacturing reasons. In addition in FIG. 5 the threads are shown screwed into each other, in conditions of use. In fact when the threading is made in the workshop it is known that there are tolerances and errors not only in the pitch of the threading but likewise in the width of the threads in such a way that at the workshop the steps e are determined in excess in a way such that after assembling and deformation of the metal one obtains the case shown in FIG. 5 with a value e of step in use, sufficient to resist all applied stresses. In a general way it is preferred that the useful step e be between 1.8 and 2.2 times the useful height h of the thread.

FIG. 5 shows a thread having a quasi perfect form of a parallelogram, with the exception of re-entrant and outgoing angles which are rounded, but one can, as a variation, especially to avoid manufacturing difficulties, provide between the front flank 16 of thread 14 and its rear flank 23 an angle which can be for example advantageously from 6° to 10° instead of zero.

In addition because of tolerances on the heights of threads and depths of grooves a radial clearance in at least one of the crests or grooves of the threading is acceptable, as can be seen in FIG. 5.

As an example joints according to the invention, formed on rolled tubes, can have the dimensions shown in the following table:

| exterior diameter φ of rolled pipe mm | Wall Thicknesses | | Length of the machined and threaded part according to thickness | Taper of threading | Dimensions of threads | |
|---|---|---|---|---|---|---|
| | mini-mum | maxi-mum | | | depth | pitch (2 × 1) |
| 101.6 | 7.3 | 10 | 30 to 80 | 12.5% to 17.5% in relation to diameter | 0.80 | 3.175 |
| 114.3 | 7.15 | 10.2 | 30 to 80 | | | |
| 127 | 9.7 | 17.5 | 35 to 140 | | | |
| 139.7 | 9.8 | 17.5 | 35 to 140 | | | |
| 152.4 | 10 | 17.5 | 40 to 140 | | 0.85 | 4.233 |
| 168.3 | 11 | 17.5 | 40 to 140 | | | |
| 177.8 | 11.5 | 19 | 40 to 140 | | | |
| 193.7 | 12 | 22 | 50 to 180 | | | |
| 219.1 | 13 | 22 | 50 to 180 | | 1.05 | 5.08 |
| 244.5 | 10 | 23.5 | 50 to 180 | | | |
| 273 | 10 | 23.5 | 50 to 180 | | | |
| 298.45 | 13 | 25 | 50 to 180 | | | |

In the embodiment of FIGS. 1 and 3 joints are shown in which the threadings have a groove height or depth which is constant up to the immediate vicinity of the abutment region. Referring now to FIG. 6, a joint is shown according to a variation of FIG. 1 in which the threads, as they approach the abutment have a height which diminishes progressively. In the greatest part of male and female threadings the male and female threads 14, 15 can be seen extending along parallel conical surfaces 24, 25. On the other hand, when one passes a plane 26 near the abutment it can be seen that for the female element 2 the cone 25 is transformed into a more accentuated cone 27 caused by a truncation. When the threads of the female threadings are made in this truncated region the taper of the geometric cone is reduced by the female threading tool and the last female threads 28, 29 and 30 diminish progressively in height. It can be seen however that the width of each thread remains constant and equal to the width of threads 15 since these threads have the form of a parallelogram. In addition the bottoms 31, 32 of the grooves of the female threading remain parallel to the bottoms of the grooves which separate threads 15 of the male threading.

Beginning from the transverse plane 26 it can be seen that the cone 24 of the crests of the male threading changes into a cone 34 with a much smaller angle or even becomes cylindrical due to a suitable truncation. The taper of the geometric cone produced by the male threading tool is greater than cone 25 in such a way that the height of the last male threads 35, 36 diminish progressively. The taper according to which the bottoms 31, 32 extend, that is the taper of the geometric cone produced by the tool which makes the end of the female threading is essentially equal or slightly greater than the taper of the truncation 34, is the same as the taper of cone 27, and is essentially equal or slightly less than that of the tapered surface made by the tool producing the male threadings beginning from plane 26.

It is understood in addition that, from the fact of the different tapers between the male elements and the female elements a slight variation in pitch is produced between the threads of the male threading and those of the female threading. In addition, experience shows that by using ordinary machine tools to make threadings with the cross-section of a parallelogram the disappearing threadings according to the invention can be obtained simply by modification of the taper of the surface produced by the tool without modification of the thread pitch or of the depth setting of the tool.

In this embodiment of FIG. 7, the diminishing of the height of the threads near the abutment region is accomplished for the female threadings, without any modification of the taper which corresponds to the path of the threading tool. It can be seen that in this fashion the different roots or bottoms of the grooves of the female threads 37, 38 are aligned on the cone traversed by the tool. The disappearance is obtained simply by a more tapered truncation 39. On the other hand the disappearance of the male threading is obtained by greatly increasing the taper of the path of the male threading tool which produces roots 41, 42, 43 always parallel to the roots of the whole threads but rising in tiers according to the taper which is essentially the same as that of the truncation.

Of course in the case where a joint is made with an internal abutment such as is shown for example in FIG. 3, it is the smallest diameter threads, near to the abutment region which are made in a disappearing fashion.

In addition one can likewise, if desired, make the last threads of the male and female threadings at the extremities of the threadings spaced from the abutment region in a disappearing fashion in such a way that the male and female threadings terminate at their two extremities with disappearing threads. This permits for example to increase the thickness of end 3 on FIG. 1 and to make the part 6 of the female element more rigid by increasing its thickness as a result of the disappearing threads.

One can likewise, within the scope of the invention, make threads at trapezoidal closed angles in which the two flanks are not parallel, the base of a thread being larger than its crest. In this case it is understood that in the region of the disappearing threads the small base of the threads of one of the two elements, for example the female element, ought to be at least as large as the large base of the thread of the other element in order to permit an interlocking. It is then necessary to furnish the two elements with different threads according to their width.

The previously described joints, with their abutment surface, have a sufficient water-tightness to effectively resist the differential pressure whatever be its direction and to prevent the appearance in the metal of excessive unit stress.

One can however want to obtain a watertight continuation of the internal surface of the joint, for example, to isolate the surface from the threadings, to obtain a continuous internal diameter without turbulent forces or risk of condensation forming, and to limit loss of pressure or to isolate the metal of the female element from the ingress of internal fluid.

Then the female element of the joint (FIGS. 9–12) is made on a sleeve 44 which participates thus in the formation of two consecutive joints since it joins two male elements 45, 46. The abutment region 47, located at the external side of the joint has a conical concave peripheral shoulder 48 and convex shoulder 49 and the surface of the convex internal shoulder 51 extends almost horizontally, having a slight angle which corresponds for example to the slight angle of taper of the threading while the opposed surface 52 of the female element presents a still smaller angle.

Each male element terminates beyond its threading at an extension in the form of a relatively thin end 53, 54 which extends interiorly to a middle region 55 of the sleeve.

As shown at FIG. 10, it can be seen that end 53 can be formed with a tapered outer surface 56 designed to cooperate with a complementary tapered inner surface 57 which borders region 55. A chamfer 58 can then be provided exactly at the extremity of the end to facilitate guiding its movement. As a variation, as can be seen in FIG. 11, and in a preferred manner, the external surface 59 of end 53 can be cylindrical, but again with a terminal chamfer 58, to cooperate with an internal cylindrical surface 60 of central region 55. Of course in the disassembled state the external diameter of surface 59 is slightly greater than the internal diameter of surface 60, the connection being effected easily due to the flexibility of end 53.

As can be seen from FIGS. 10 and 11, a slight axial clearance exists between the extremities of the two ends 53 and 54, shown by d. One can, at the preference of the user, make joints such that this clearance d is always present and of sufficient extent to permit for example the insertion, between the two extremities, of a more or less compressible element which can be a seal and which forms a continuation of the external surface. As a variation, one can deal with either the existence of a slight play d, or its suppression as a function of diverse assemblies and disassemblies of interchangeable elements of the joint, and as a function of manufacturing tolerances.

In another variation one can alternatively manufacture in such a way that the two extremities of the ends 53 and 54 are constantly applied in abutment against each other, which by the effect of the axial compression causes a diametrical expansion of the extremities of the two lips towards the free region 61 between the two chamfers 58. One can, as shown in FIG. 12, modify the extremities of ends 53 and 54 to create a space 62 analogous to space 61 but larger while maintaining the extremities of tongues 53, 54 quite thin to facilitate plastic deformation without disturbing the smooth internal profile.

In addition, one can have on the internal surface elements including tongues 53, 54 and preferably likewise on the extremities of the tongues and on their external surfaces, a coating (like coating 63 of FIGS. 10 and 11) of a convenient type which can likewise be provided in the middle part of the sleeve. These coatings can have any desirable thickness and can be organic, metallic, ceramic or any other material.

What is claimed is:

1. A pipe joint comprising male and female members having coengaged conical threads, said male member having an external shoulder in abutting contact with a shoulder on the end of said female member where said threads are screwed tightly together, the bearing flanks of said threads on said male member which are opposed to said external shoulder, and the companion bearing flanks on the threads on said female member, being inclined toward said external shoulder at an acute angle with respect to the axis of said joint to provide interlocking threads, said threads being formed to have progressively diminishing heights in the vicinity of said shoulders and to vanish closely adjacent thereto, said shoulder on said female member comprising an annular internal concave sealing surface surrounded by an annular peripheral convex abutment surface, said shoulder on said male member comprising a convex internal annular sealing surface and a concave external annular abutment surface, said concave sealing surface on said female member and said convex sealing surface on said male member engaging one another when said joint is made up to provide a fluid-tightness against internal as well as external fluid pressure, said abutment surfaces and said bearing flanks of said threads providing an interlocking action of the threads and an increase of the sealing forces on said sealing surfaces of the male and female members, the bearing flanks of said threads which are closest to said abutment surfaces being at a distance from said abutment surfaces which is less than two times the pitch of said threads.

2. A joint according to claim 1 wherein said threads have a cross-section substantially in the shape of a parallelogram.

3. A joint according to claim 2 wherein the width of each thread is in a range between 1.5 and 2.5 times its useful height.

4. A joint according to claim 3 wherein the said width is in a range between 1.8 and 2.2 times its useful height.

5. A joint according to claim 1 wherein said female member comprises a sleeve forming two oppositely opening female portions for receiving two male members directed toward each other, said shoulder on said female members being at the opposite ends thereof, and wherein an end of each male member comprises a thin lip radially engaging a corresponding internal surface of said sleeve to obtain fluid-tightness.

6. A joint according to claim 1 wherein the value of said acute angle is less than 80°.

7. A joint according to claim 5 wherein said lips have a cylindrical external surface cooperating with a cylindrical internal surface of the sleeve.

8. A joint according to claim 5 wherein the end surfaces of said lips are adjacent and spaced apart, and a fluid-tight element is disposed between said lip end surfaces.

9. A joint according to claim 5 wherein the end surfaces of said lips engage one another, a space being provided peripherally of the region of engagement to receive a deformation of the metal of said lips.

10. A joint according to claim 5 wherein a protective coating covers said lips.

11. A joint according to claim 5 wherein a protective coating covers the internal surface of the middle portion of said female sleeve.

12. A joint according to claim 8 wherein the end surfaces of said lips engage one another, a space being provided peripherally of the region of engagement to receive a deformation of the metal of the lips.

13. A joint according to claim 8 wherein a protective coating covers said lips.

14. A joint according to claim 8 wherein a protective coating covers the internal surface of the middle portion of said female sleeve.

* * * * *